United States Patent Office 2,741,877
Patented Apr. 17, 1956

2,741,877

METHOD OF PRODUCING SYNTHETIC MICA

Frank J. Dobrovolny, Lewiston, N. Y., assignor to E. I. du Pont de Nemours and Company, Wilmington, Del., a corporation of Delaware No Drawing. Application February 23, 1952,
Serial No. 273,160

14 Claims. (Cl. 49—77)

This invention relates to synthetic mica in sheet form and to a novel process for crystallizing it from a homogeneous melt as a continuous lamellar crystal.

The natural mica crystal as found has a laminated structure which permits it to be split into thin flexible transparent films. Mica is impervious to fire, water, acid or electricity and remains constant in volume between very low temperatures and up to about 600° C. This combination of properties is not duplicated in any other mineral and, for this reason, mica is unique and essential as dielectric and insulation material for such things as radio and radar equipment, electric motors and generators, magnetos, spark plugs, compass cards, diaphragms, television, and many electric appliances. Mica is a strategically important material not found in adequate quantities and qualities in this country, so that over 90% of that used must be imported.

Natural mica is expensive in the first place because it is dispersed with much useless material in nature so that much labor is involved in extracting it from the earth. In the second place, mica as found is exceedingly variable in purity and in size so that no two blocks or books of it are the same and this requires much labor to sort out pieces that will conform to standards of quality classifications. Commercial mica blocks will yield sheets usually in the range between 1 and 36 sq. in. Anything above this size is considered special. Blocks capable of giving sheets over 100 sq. in. are considered museum pieces. Finally, the "books" must be split into suitably graded sheets or films depending upon the end use and this is so laborious that only the cheap labor found in Asia can be used for this purpose. The average worker finds it difficult to split more than 1 lb. of mica into thin sheets in one day. Because of the variable nature of the mica blocks and books, no successful mechanical mica splitter has so far been found practical.

For these and other reasons, considerable effort has been expanded in Germany and in this country to synthesize mica, but with no commercial success. All natural micas contain the hydroxyl group which is called a mineralizer since without it no mica crystal seems capable of existence. However, at the elevated temperatures at which mica will crystallize, the hydroxyl is fugitive and impractical high pressures would be needed for this synthesis. It was later found that occasional phlogopite micas had been formed in nature in which some of the hydroxyl was replaced by fluorine, and synthesis became possible at ordinary pressures by complete replacement of hydroxyl with fluorine as the mineralizer.

The common mica of commerce is mostly of the muscovite variety which has approximately this formula: $K_4Al_3(Al_4Si_{12}O_{40})(OH)_8$. The phlogopite mica of nature has usually this formula: $K_4Mg_{12}(Al_4Si_{12}O_{40})(OH)_8$. The laboratory synthesis of mica having received most attention up to now is based on the phlogopite structure and the basic formula can be written thus:

$$K_4Mg_{12}(Al_3Si_{12}O_{40})F_8$$

and is referred to as fluorophlogopite mica. The potassium can be replaced by other large cations, such as rubidium, calcium, barium, etc. Magnesium and aluminum can be replaced by medium sized cations, such as iron, manganese, titanium, lithium, etc. Some variation is permissible in the ratio between silicon and aluminum. No other mineralizer has so far been substituted for fluorine with commercial success, but the possibility cannot be excluded that other halogen, especially chlorine, may replace a fraction of the fluorine. Wherever I use the term "synthetic mica" herein, I refer to the possible permutations and combinations of elements as above delineated and especially as regards partial substitutions in the basic fluorophlogopite formula $K_4Mg_{12}(Al_3Si_{12}O_{40})F_8$. However, up to this time best results have been obtained by so formulating the choice of raw material from which mica is to be made that the proportions of the above formula will approximately obtain in the synthetic crystal.

While various formulations of fluorophlogopite mica have resulted in mica crystals, no commercially feasible process has thus far been discovered for making the crystals in large sheet form. The largest specimens of synthetic mica sheet rarely measure up to 4 sq. in. in area and they must be broken out of a mass of polydirectional crystallized material. All this work was based on melting the raw material in platinum or special ceramic crucibles, cooling slowly, generally for many days, and then either peeling off the platinum or breaking up the ceramic crucible to recover the product, generally not more than one or two percent of the entire mass. This work, while scientifically important and interesting, has not led to a practical process for making commercial synthetic mica. The chief reason for this failure is the fact that a suitable method for crystallizing the mica unidirectionally in a thin sheet and outside of the mass of the melt has not heretofore been available.

However, the synthetic mica thus far made has all the unique properties of natural mica and, in addition, can be obtained in much purer form and the composition is reproducible at will. Dielectric properties are as good as natural mica and thermal resistance is better, going at least up to 900° C. before any decomposition takes place. Synthetic mica has very high resistance to flow under pressure of upwards of 10,000 lb./sq. in. Indeed, synthetic mica, if it could be made on a large commercial scale by an economically practicable process, would have all of the advantages of natural mica and very few of its limitations.

Accordingly, the major objective of my invention is to provide a new and workable process for continuously forming mica in sheet form from a melt of commercially available raw material. Other objects of the invention include: an improved process for the production of synthetic mica in sheet form; to produce synthetic mica sheets of 20 sq. in. and greater in surface area and in width from about an inch up to several feet; and a process for continuously converting a synthetic mica melt into ribbons or sheets of mica of substantially any desired width, practically indefinite length, and in thickness between about 0.001 to 0.5 cm. Still other objects will be apparent from the following description.

The above objects may be attained in accordance with the present invention by flowing a thin layer of a synthetic mica melt into a cooling or crystallizing zone and cooling the resulting solid mica sheet so that at the liquid-solid interface, the temperature of the liquid phase is above the solidification temperature and the differential between the solid and liquid phases is not less than about 20° C. In continuous operation, the cooled, solid sheet is moved away from the point of crystallization substantially at the rate of crystal growth.

Various methods and means may be utilized for crystallizing synthetic mica in accordance with the above stated principle of operation. In a preferred method which is described by way of example, the mica melt first is prepared and treated in the conventional manner to insure purity of product and the absence of crystallization foci in the melt, for example, by holding the melt at a temperature well above its solidification point for a reasonable period of time. The prepared melt, at a temperature of 20° to 75° C. or higher above its solidification temperature, is flowed onto the surface of a molten metal, such as copper or silver which is confined preferably in a shallow container provided with means for maintaining the desired temperature of the metal. The temperature of the molten metal bath is maintained at about 50° C. below the temperature of solidification of the mica melt and preferably at about 20–100° C. below that temperature. Thus, for a mica melt solidifying at about 1350° C., the temperature of the molten copper or silver preferably is maintained at 1250° to 1330° C. A temperature lower than 1250° C., even down to room temperature, is equally satisfactory but for practical purposes more difficult to control. A substantially horizontal stream of the molten mica is flowed onto the surface of the molten metal bath at one side of the bath container so as to form a layer not more than 0.5 cm. thick, e. g., from 0.01 to 0.3 cm. The resulting sheet of solidified mica then is slowly moved across the surface of the molten metal and hence out of the molten metal bath at a point opposite the point of introduction of mica melt, the rate of movement being substantially equal to the rate of solidification of the mica melt where the latter first contacts the molten metal. The result is a continuous formation of a solid mica sheet of lamellar character which is continuously removed from one side of the molten metal bath while the hot mica melt is continuously fed in at the other side. As the mica sheet is thus continuously moved from the molten metal bath, it may be cut into lengths of desired size or rolled up on a reel of suitably large diameter depending upon the thickness of the sheet produced. The mica sheet thus produced may be split into thinner sheets of any desired thickness, although it is preferably grown directly to the desired thickness.

A furnace for melting and fining the mica melt may suitably be constructed like a conventional glass furnace, for example, a furnace used in the manufacture of sheet glass suitably modified to permit the desired thin stream of mica melt to overflow onto the surface of a molten metal bath confined in an adjacently located container. In this modification, the melt should be adequately heated at the exit end of the furnace so that the melt will be above its solidification temperature at the moment it strikes the molten metal. The level of the molten metal should be maintained only slightly below that of the mica melt in the furnace, for example, from 1 to 5 cm. so as to avoid turbulence at the point of introduction of the melt onto the molten metal surface.

To avoid turbulence at the side edges of the molten metal bath and to prevent mica from sticking to the side walls of the molten metal bath container, in a preferred installation, the molten metal bath may be made somewhat wider than the width of the stream of melt entering the bath so as to leave an open space between the side edges of the resulting solid mica sheet and the side walls of the molten metal bath. The exposed molten metal surface between the edges of the mica sheet and the side wall of the molten metal bath container may be protected from air oxidation by various conventional means, for example, a floating layer of carbon or graphite but preferably by an inert atmosphere.

In another modification of the invention, the operation is carried out as described above expect that the mica melt furnace is extended to embrace a portion of the molten metal bath so as to maintain that portion of the metal bath at exactly the same temperature as that of the mica melt. This relatively hot portion of the molten metal bath is separated from the remaining cooled portion by means of a partition which extends to a short distance below the molten metal bath surface, this partition being located preferably near the exit end of the furnace. This results in the formation of liquid layer of the mica melt on the hot molten metal and crystallization of the mica melt layer commences at the point just beyond the aforesaid partition where the melt comes in contact with the cooler molten metal.

The above-mentioned partition preferably will extend up to within 0.1 to 1 cm. of the floating mica layer, and its distance from the bath surface hence will depend on, and may be calculated from, the thickness of the mica layer and the respective specific gravities of the mica and the molten metal.

In still another modification of the invention, the mica melt is flowed through a slot-shaped opening which is located below the surface of the molten metal bath. To accomplish this result, the surface of the mica melt in the furnace is maintained some distance higher than the surface of the molten metal bath, this distance depending upon the respective specific gravity of the two molten liquids. The advantage of this arrangement is to apply the cooling effect of the molten metal simultaneously on both sides of the resulting solid sheet of mica. As the mica melt enters the molten metal bath, it is solidified to form a solid mica sheet which is supported by a grid or baffle suitably arranged in a horizontal plane just above the orifice, and further arranged so as eventually to guide the sheet upwardly at a slight angle so as to emerge from the molten metal bath at a point opposite the orifice of the furnace.

In a different modification of my process, I may allow the suitably melted and fined mica melt to flow vertically into a thin slot-shaped crystallizing chamber. This chamber or slot is preferably less than 0.5 cm. in the narrow section and as wide as the width of the mica film desired, say from less than one inch to several feet. The chamber is preferably made of platinum, although other metals may be used provided they retain sufficient rigidity at the temperature involved. The mica sheet is withdrawn from the slot-shaped chamber at the rate of formation of the crystal. The chamber itself must be cooled so as to provide a temperature differential of at least 20° C. between the solid and liquid phases of the mica being produced.

In another method for making synthetic mica sheet, I allow the molten mica to fall vertically into the space between two rotating metal rolls so spaced that the distance between these rolls constitutes a cooling zone of a width less than 0.5 cm. These rolls are rotated at the rate of mica crystal growth and they are kept at a temperature at least 20° C. below crystallizing range of the mica being synthesized.

In practicing my invention, I have found that there is considerable latitude as to starting raw materials. A mixture of 40.2% $SiO_2$ 5.7% $Al_2O_3$, 27.3% MgO and 26.8% $K_2AlF_5$ has given good quality fluorophlogopite mica crystals. Depending upon availability and costs, other mixtures can be used and are usually formulated around the fluorine-containing component. Thus, $K_3AlF_6$, $K_2SiF_6$, KF, $MgF_2$, etc., can be used. It is best to have a slight excess of fluorine since some of it is usually lost, depending upon the rate of melting, the type and size of furnace and other factors of the particular installation used. If water of hydration or carbonates are present, the loss of fluorine from the melt will also be greater and, therefore, it is preferable to use anhydrous and dead burned materials.

While by way of illustrating my invention, I have described the production of sheets of fluorophlogopite mica, the invention is directed primarily to a novel mode of procedure for crystallizing a mica melt to produce sheets exhibiting lamellar crystal form. My invention, therefore, is not restricted to any particular species of mica composition but embraces the utilization of any synthetic mica melt capable of lamellar crystallization.

While fluorine is the best mineralizer developed up to now, it is possible to replace part of it with other halogen, especially chlorine, in synthesizing mica. Any negative atom or group of atoms which act as a unit, such as cyanogen (CN), having a suitable atomic or group diameter approximating the diameter of the hydroxyl group, can probably be used in place of either fluorine or hydroxyl provided it can be introduced without the need of excessive pressure during synthesis of the mica.

The mixture of raw materials can be melted in any type of furnace which will supply adequate heat at the elevated temperatures necessary. Induction heating, electric arc heating, electric resistance within a pool of molten mica mixture or a Globar-type of furnace can be used. In general, I would avoid the use of a flame impinging directly on the melt because this can result in excessive fluorine losses and thus make control of the melt composition difficult. The melting vessel must resist going into solution in the melt which has a powerful dissolving action on silica and silicates. Such materials as silicon carbide, graphite and platinum-lined refractory magnesia can be used.

I have found it advantageous to heat the mica melt at sufficiently high temperatures and long enough to dissolve all small particles, such as quartz, so as to eliminate them as foci of crystallization since, if many such particles are present when the crystallization of mica begins, the crystal structure will have random orientation and no continuous sheet of mica can be made. In general, it is impractical to obtain complete solution and homogenization below 1400° C. even with long heating. As the temperature of the melt is raised, solution is faster and if the raw materials were well mixed before fusion, it is possible to remove substantially all nucleation particles by holding the melt for one-half to one hour at 1450° to 1500° C.

I prefer to melt the mica mixture continuously with provision for means to prevent segregation and possible disproportionation of the components. This can be done by having a melting chamber and a homogenizing chamber or region. From the latter chamber, I provide a short but wide-heated channel whereby a thin stream say of less than 0.5 cm. thickness and of any desired width, say from one inch to several feet, can be allowed to flow into the crystallizing zone or region. The distance of travel between the crystallizing zone and the homogenizing chamber should be as short as possible, preferably less than one foot. As the melt traverses this channel, it should cool very little and certainly must arrive at the crystallizing zone at a temperature above the fusion temperature of the mica being synthesized. This channel can be constructed of the same material as the melting vessel.

At the crystallizing zone, it is essential to provide means for cooling the stream of molten mica at a rate such that a relatively wide temperature differential continues to exist between the growing crystal edge and the melt. For a preferred fluorophlogopite composition mentioned earlier, I prefer to cool the solidified mica down to about 1300° C. and preferably as much lower as possible, even down to 1100° C., so as to provide for fast crystal growth on the edge or front of the continuously growing mica sheet. Mica grows in sheet or lamellar form because atom deposition is several times as fast along the thin edges than along the flat or large surface area. In a cool melt, the atoms take longer to orient themselves into the crystal pattern than in a more fluid melt. Now, if the crystal front or edge is kept below the melting temperature, quick growth can be achieved if the heat is removed in the direction of crystal growth. I have discovered that mica can be grown in a sheet form and continuously by supercooling the growing crystal rather than the melt. In this way, only the growing crystal edge provides a region for atom deposition, whereas, when the liquid is cooled below the melting temperature of the substance to be crystallized, the nucleation process will start from many centers and the solid, as formed, will have random and interlacing or interpenetrating crystal structure which makes it worthless as a source of sheet mica.

To maintain an adequate temperature differential between the growing crystal edge and the liquid melt or fusion, the crystal sheet must be drawn out of the crystallizing zone as fast as it is formed, but not faster than the rate of growth. The rate of crystal growth and the rate of cooling must be in balance. The temperature differential between the solid and the liquid phases at the solid-liquid interface must not be less than about 20° C. and preferably will be about 40° to 100° C. If this temperature differential is substantially less than about 20° C., more or less random orientation of crystal growth occurs, preventing the formation of mica sheet of good quality. If desired, this temperature differential may be much greater than the above stated preferred range, for example, as great as around 500° C. with equally good results although small utility results from a differential greater than 200° C.

An important feature of the invention resides in cooling the solidified mica sheet, so that heat is conducted through a portion of the sheet from the liquid-solid interface where crystallization occurs to the point or region where cooling is applied. While in its broader aspects the invention is not restricted to any specific cooling method, I prefer to cool the sheet by means of a molten metal bath as above described. A wide choice of metals and alloys is available for this purpose, and any metal may be used which is molten but is not excessively volatile at the temperatures employed and does not react or form solutions with the mica at such temperatures. Preferred metals are silver, copper, and tin. Aluminum can be used if oxidizing conditions are avoided. Various alloys of these and other metals having suitable melting and boiling ranges can be used. Alloys of silver and of copper are quite useful, especially if these metals constitute about 90% of their respective alloys. Gold and its alloys are likewise suitable, but generally may be too expensive for economical operation.

The thickness of the mica sheet produced will be substantially the thickness of the thin layer or stream of mica melt brought into the crystallization zone. As a matter of practical operation, this thickness may vary from about 0.005 to 0.5 cm. and, generally, I prefer to produce a sheet 0.05 to 0.3 cm. thick. The resulting mica sheet, like books of natural mica, may be split into thinner sheets as desired.

The surface area of mica sheets produced by my invention is limited only by engineering problems encountered in building the necessary operating equipment. Generally, it will be most practical to flow into the crystallization zone a stream of melt from around 6 in. up to 10 ft. wide. If desired, still narrower streams may be employed to produce a narrow ribbon of sheet mica, e. g., from less than 1 in. up to 6 in. wide. The length of the continuously formed sheet is, of course, indefinite. Preferably, the continuously formed sheet or ribbon is cut off to provide pieces of convenient dimensions. My invention thus provides a means for producing mica sheets of surface area larger than any heretofore produced, from at least 20 sq. in. up to 10 sq. ft. and larger.

I claim:

1. The process for the production of a synthetic mica as a continuous lamellar crystal sheet which comprises flowing molten mica in a thin stream into a crystallizing zone, cooling the thin stream to cause crystallization and at such a rate that a temperature difference of upwards of 20° C. be maintained between the solid crystal formed in said crystallizing zone and the said thin stream at the liquid-crystal interface and withdrawing the mica sheet thus formed substantially as rapidly as formed from said zone.

2. The process for the production of a synthetic mica as a continuous lamellar crystal sheet which comprises flowing molten mica in a stream less than 0.5 cm. thick into a crystallizing zone, cooling said stream to cause crystallization and at such a rate that a temperature difference of upwards of 20° C. be maintained between the solid crystal formed in said crystallizing zone and the said stream at the liquid-crystal interface and withdrawing the mica sheet thus formed substantially as rapidly as formed from said zone.

3. The process for production of fluorophlogopite mica as a continuous lamellar crystal sheet which comprises flowing molten mica in a thing stream about 0.005 to 0.5 cm. thick into a crystallizing zone to cause crystallization, and cooling said stream in said zone at such a rate that a temperature difference of upwards of 20° C. be maintained between the solid crystal formed and the said thin stream at the liquid-crystal interface and withdrawing the mica sheet thus formed substantially as rapidly as formed from said zone.

4. The process for the production of a synthetic mica which comprises flowing a mica melt in a thin layer about 0.005 to 0.5 cm. thick, cooling the flowing melt to solidify a portion and moving the solidified portion in the direction, and at the flow rate, of the flowing melt, while cooling the solidified portion and regulating the flowing melt temperature so that substantially at the junction of the liquid and solid phases, the melt temperature is not less than about 20° C. higher than the temperature of the solid phase.

5. The production of a synthetic mica which comprises flowing a fluorophlogopite mica melt onto the surface of a molten metal, the temperature of which is maintained at at least about 20° C. below the solidification temperature of said melt.

6. The production of a synthetic mica which comprises flowing a fluorophlogopite mica melt onto the surface of a molten metal, the temperature of which is maintained at 20° to 100° C. below the crystallization temperature of said melt and moving the resulting mica sheet away from the point of crystallization at substantially the rate of crystal growth so as to continuously form a mica sheet floating on said molten metal.

7. The process for the production of a synthetic mica which comprises flowing a mica melt in a thin layer about 0.005 to 0.5 cm. thick into contact with the surface of a body of molten metal substantially chemically unreactive with the constituents of said melt and not more than slightly soluble therein, while maintaining the temperature of the flowing melt above its solidification temperature and maintaining the temperature of said molten metal 20° to 100° C. below said solidification temperature and removing the resulting solidified mica sheet from the molten metal surface.

8. The production of a synthetic mica which comprises continuously flowing a mica melt onto the surface of a molten metal to form a flowing, floating layer of melt about 0.005 to 0.5 cm. thick, cooling at least a portion of said molten metal to a temperature of 20° to 100° C. below the solidification temperature and moving the resulting floating solid mica sheet in the direction of flow of said floating layer of melt at substantially the rate of solidification.

9. The process for producing a synthetic mica which comprises continuously flowing a mica melt in a thin layer about 0.005 to 0.5 cm. thick into a molten metal having a temperature of 20° to 100° C. below the solidification temperature of said melt and continuously moving the resulting solid mica sheet substantially at the rate of its formation through said molten metal in the direction of the flow of said mica melt.

10. The process for producing a synthetic mica which comprises continuously flowing a mica melt in a thin horizontal layer about 0.05 to 0.3 cm. thick into contact with the surface of a molten metal having a temperature of 20° to 100° C. below the solidification temperature of said melt and continuously moving the resulting solid mica sheet substantially at the rate of its formation across said molten metal surface in the direction of the flow of said mica melt.

11. The process of claim 10 wherein said melt has substantially the composition of a fluorophlogopite mica and said molten metal comprises at least about 90% by weight of silver.

12. The process of claim 10 wherein said melt has substantially the composition of a fluorophlogopite mica and said molten metal comprises at least about 90% by weight of copper.

13. A process for making fluorophlogopite mica comprising melting the mixture of mica raw materials, holding the resulting melt above 1400° C. until all solid components have dissolved; thereafter, flowing the homogeneous mica melt continuously as a thin stream about 0.005 to 0.5 cm. thick into a cooling zone, removing heat from the stream at a rate such that a temperature differential in excess of 20° C. is maintained at the liquid-crystal interface and drawing the crystallized mica sheet away from the cooling zone as fast as the crystal growth proceeds.

14. In the process of synthesizing mica in sheet form from a homogeneous melt, the steps comprising flowing the melt in a thin stream about 0.005 to 0.5 cm. thick into a cooling zone wherein the mica crystal is formed continuously by deposition at the crystal edge and maintaining a temperature differential of not less than 20° C. between the crystal and the melt and continuously withdrawing the resulting sheet of mica crystal as formed.

References Cited in the file of this patent

UNITED STATES PATENTS

| | | |
|---|---|---|
| 789,911 | Hitchcock | May 16, 1905 |
| 885,934 | Machalske | Apr. 28, 1908 |
| 1,944,848 | Scheidt | Jan. 23, 1934 |
| 2,041,448 | Zinn | May 19, 1936 |
| 2,185,280 | Stuckardt et al. | Jan. 2, 1940 |
| 2,363,323 | Hill | Nov. 21, 1944 |
| 2,509,845 | Slayter | May 30, 1950 |
| 2,549,880 | Bardet | Apr. 24, 1951 |
| 2,645,060 | Waggoner | July 14, 1953 |

FOREIGN PATENTS

| | | |
|---|---|---|
| 735,360 | Germany | May 13, 1943 |

OTHER REFERENCES

Proceed. of International Congress of Pure and Applied Chem., 1947, pages 167–170. "Synthetic Mica," by Kendall and Spraggon.

Ceramic Age, Feb. 1950, pages 81 and 106. "Synthetic Mica."

Minerals Yearbook 1947, U. S. Dept. of Interior, Bureau of Mines, pages 788, 790, U. S. Printing Office 1949.

The Synthetic Mica Program—2 "Monthly Research Report of the Office of Naval Research," April 1, 1950, pages 20–24, Office of Naval Research, Dept. of Navy, Washington, D. C.